Schematic Diagram of Powered System for Extracting Air from Sea Water

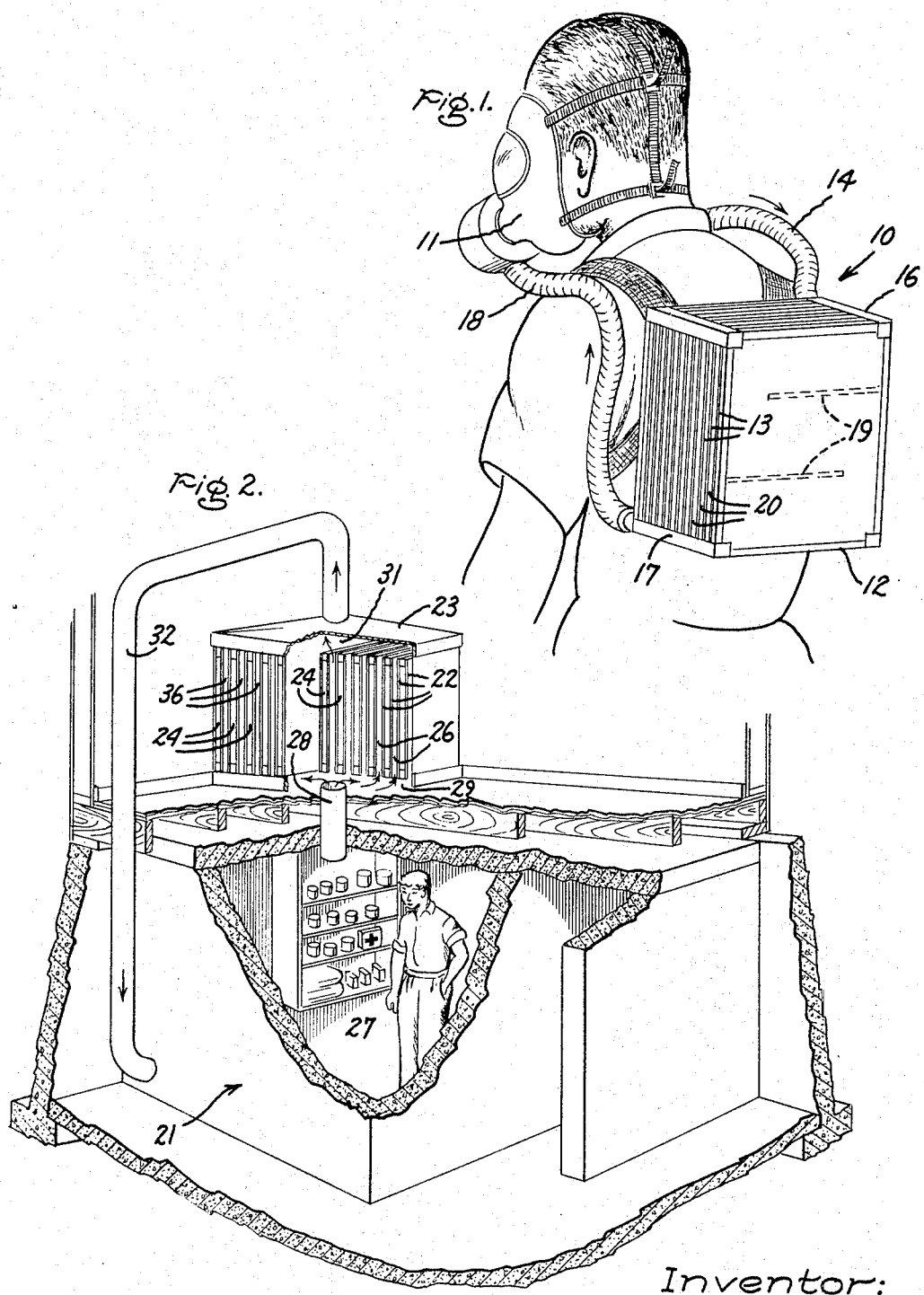

Schematic Diagram of Submarine Air Supply $O_2$ Balance
  $0.35 \times N = 4$ Liters/min. $+ 0.20 \times M$ $N_2$ Balance
  $0.632 \times N = 0.79 \times M$ $N = 21.1$ Liters/min. of 35% $O_2$ Inventor:
Walter L. Robb,
by Leo J. Mastosi
His Attorney.

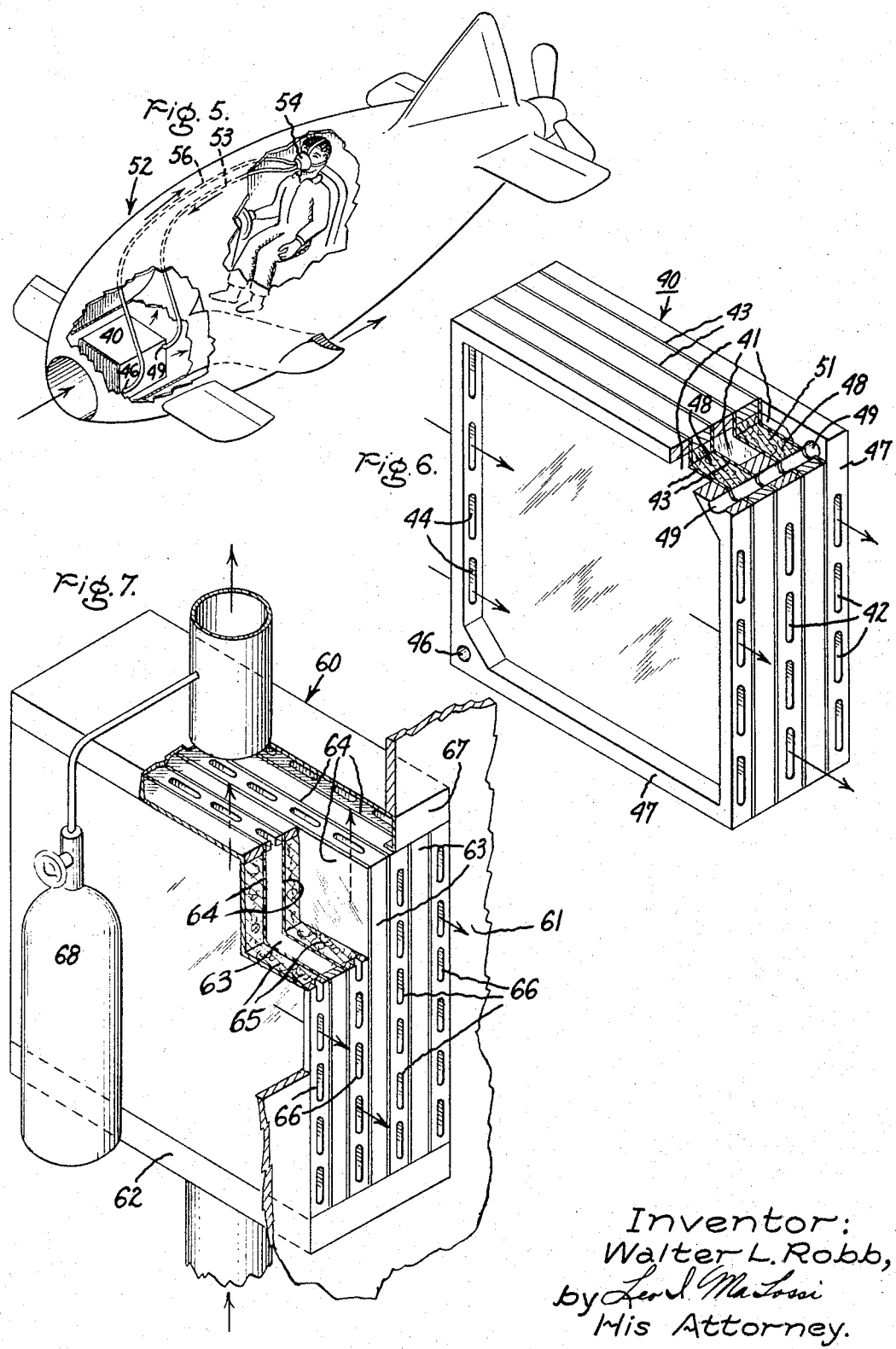

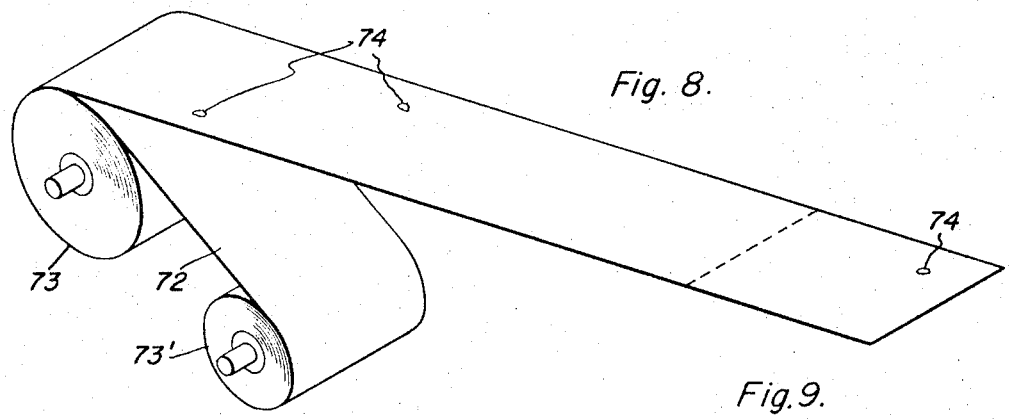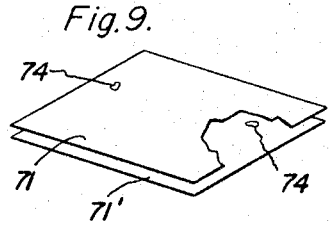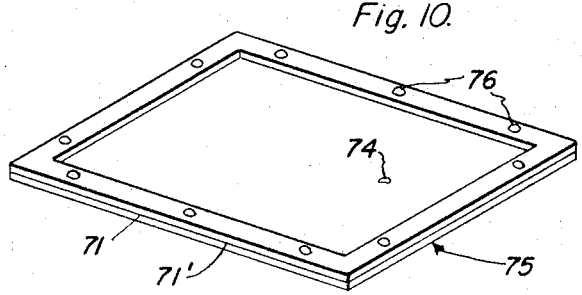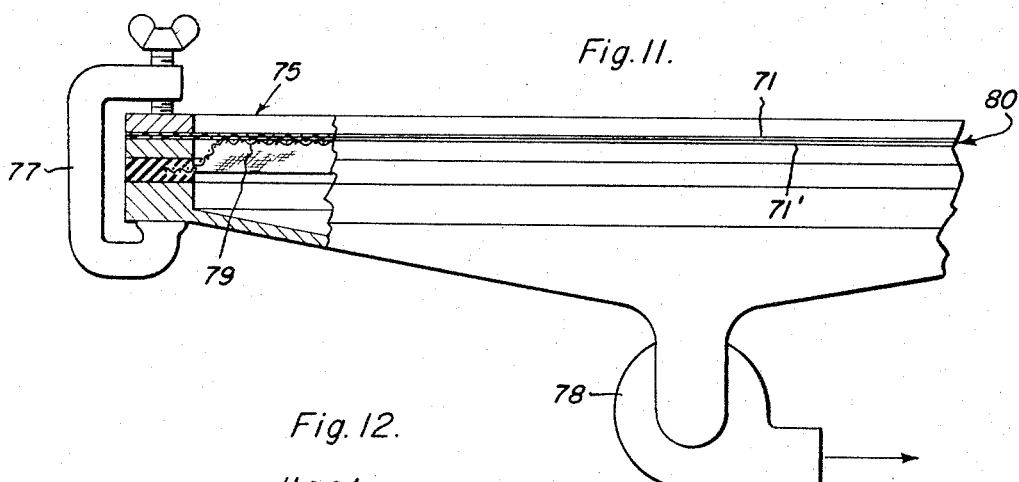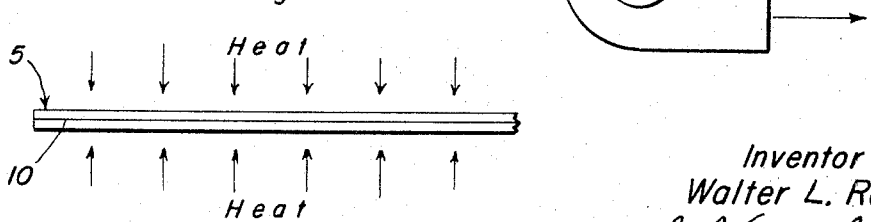

United States Patent Office 3,369,343
Patented Feb. 20, 1968

3,369,343
STRUCTURES AND PROCESSES INCORPORATING PERMEABLE MEMBRANES FOR THE SUPPORT OF ANIMAL LIFE DURING UNFAVORABLE CONDITIONS
Walter L. Robb, Scotia, N.Y., assignor to General Electric Company, a corporation of New York
Application June 24, 1965, Ser. No. 466,698, now Patent No. 3,325,330, dated June 13, 1967, which is a continuation-in-part of application Ser. No. 269,430, Apr. 1, 1963. Divided and this application Mar. 1, 1966, Ser. No. 530,810
8 Claims. (Cl. 55—16)

ABSTRACT OF THE DISCLOSURE

Various enclosures, structures and methods for supporting animal life processes in the low pressure rarified expanse of space, at normal atmospheric pressure during unfavorable environmental conditions and under water at significant depths are described. In each instance one or more of the following are accomplished: (a) the removal of carbon dioxide gas from exhaled breath to the ambient, (b) the replenishment of oxygen gas to exhaled breath from the ambient and (c) the simultaneous removal of both oxygen and nitrogen from surrounding water. In each case gas transfer to and/or from the ambient is via a thin permeable, non-porous wall, made of a material such as silicone, rubber, properly supported against rupture in the event of the application of a pressure differential to the wall. A method for preparing sound thin membranes having a thickness of less than about 2 mils is also described.

This is a division of U.S. patent application S.N. 466,698, now U.S. Patent 3,325,330, filed June 24, 1965, which application is a continuation-in-part of U.S. patent application S.N. 269,430—Robb (now abandoned) filed Apr. 1, 1963, and assigned to the assignee of this application.

This invention is directed in general to the use of thin semipermeable membranes in structures to enable the conduct of animal life processes during exposure to unfavorable environmental conditions and more particularly (a) to structures for the support of life under water by making available dissolved oxygen from the water (b) to survival shelters and respirators for the protection of personnel in the presence of atmospheric contamination.

Silicone rubber membranes have been found to be particularly applicable to use in this invention and the method for making thin, substantially defect-free (e.g., non-porous or hole-free), organopolysiloxane rubbery films is described herein. This process comprises (1) bringing into intimate contacting relationship at least two films of an organopolysiloxane convertible to the cured, solid, elastic state over substantially the entire contact surfaces thereof, (2) applying pressure to the contacting films to insure the removal of substantially all air from between the films, (3) stretching the films while in such contacting relationship whereby the thickness of each film is reduced to less than its original thickness and (4) converting the films of reduced thickness to the cured, solid, elastic state while still in said contacting relationship whereby permanent intimate bonding of the film surfaces is effected.

Silicone rubber membranes have been found to have an unusual ability to separate certain gases from mixtures of the latter and other gases. Thus, in Kammermeyer U.S. Patent 2,966,235, issued Dec. 27, 1960, there is disclosed a method of separating carbon dioxide from a gas mixture containing carbon dioxide and other gases, such as hydrogen, nitrogen, oxygen and helium, by permeation of the gases through a thin, non-porous silicone rubber membrane. In accordance with this patent, it has been found that the thin, non-porous silicone rubber membrane will permit a much greater flow of carbon dioxide than any of the other gases mentioned above so that the permeation of carbon dioxide through this membrane is much higher than that of the other gases in relation to their relative initial concentrations. Generally, this means of separating carbon dioxide, for instance, from air, so as to obtain a residual air mixture leaner in carbon dioxide (by relative proportion) is carried out by bringing the mixture of gases containing carbon dioxide, e.g., the aforesaid air, into contact with one side of a thin, non-porous membrane of silicone rubber, causing a portion of the mixture to permeate through the membrane (under the driving force of a difference in total pressure) said permeated portion of the mixture being enriched in carbon dioxide, while the remaining air which did not permeate the membrane is depleted in carbon dioxide.

When one employs air of normal composition ($CO_2$—about .05%, $O_2$—20.95%, A—1%, $N_2$—78%) as the mixture of gases being brought in contact with the silicone rubber membrane, it will be found that when a lower total pressure exists on the other side of the membrane the mixture of gases permeating the membrane, in addition to being enriched in carbon dioxide, is also enriched to a considerable extent in its oxygen content (since silicone rubber is more permeable to oxygen than to nitrogen), while the gases which did not permeate the membrane are proportionately increased predominantly in their nitrogen content.

The amount of gas that can permeate through a membrane of a given area in a given time is, however, dependent upon its thickness, in addition to other factors such as the pressure drop across the membrane. It is, therefore, seen that optimum results can be obtained when the thinnest possible membrane, which will withstand the pressure drop across the membrane, is used.

At the present time, silicone rubber compositions can be calendered to give relatively thin films of thicknesses ranging from about 2 to 10 mils in thickness. Silicone rubber membranes of such thicknesses are ordinarily capable of effecting some separation of gases. However, it would be highly desirable to use thinner films of the silicone rubber membrane so that a smaller total area of membrane would be required to process a given amount of gas mixture.

When attempts are made to reduce the thickness of the film below 2 to 4 mils by the usual techniques heretofore known for making thin films, for example, calendering, extruding, casting from solution, etc., several difficulties are encountered. Thus, it has been found that in making membranes of even less than about 5 mils in thickness by the usual techniques, non-uniformity in thickness and pinholes occur, both of which aspects are detrimental to the utility of the film as a gas permeable membrane. In addition, tearing often occurs as the thickness of the membrane is reduced by the usual techniques because of the lack of adequate strength of the silicone rubber membrane so reduced in thickness to withstand the processing strains encountered with such techniques.

Silicone rubber membranes of thicknesses as low as 0.1 mil can be produced by bringing into intimate contacting relationship so as to exclude all air from between the contacting surfaces at least two incompletely cured films of silicone rubber, each capable of being converted to the completely cured, solid, elastic state; stretching the films while in intimate, air-free contacting relationship so that the thickness of each film is reduced to less than the original thickness; and finally, converting the silicone rubber film (while so stretched) to the cured, solid, elastic state by usual means, for example, by heat (using curing agents for the purpose), or by irradiation with high energy radiation, as for instance, high energy electrons.

The term "silicone rubber" is intended to include both filled and unfilled organopolysiloxanes which are convertible to the cured, solid, elastic state by any of the means available in the art, for instance, by heating at elevated temperatures in the presence of cure accelerators such as organic peroxides, etc., by irradiation with high energy electrons as is more particularly disclosed in U.S. Patent 2,763,609, issued Sept. 18, 1956, etc.

The term "air" as employed herein is intended to include variations in percentages of the components from the normal mixture of gases encountered in dry atmospheric air at sea level.

The term "wall" as applied herein to describe part of an enclosure structure is intended to include any portion of the structure functioning as a separating barrier, e.g. side wall or ceiling.

The convertible organopolysiloxane or silicone rubbers such as may be used in the practice of this invention may be in the form of highly viscous masses or gummy elastic solids, depending upon the state of condensation, the condensing agent employed, the starting organopolysiloxane used to make the convertible organopolysiloxane, etc. More details of the preparation of suitable starting materials are presented in the aforementioned application S.N. 466,698.

It is, therefore, the prime object of this invention to provide novel structures for supporting and rendering safe animal life processes in other than normal environments.

Other objects of the invention will become more apparent from the discussion below.

The exact nature of this invention as well as other objects and advantages thereof will be readily apparent from consideration of the following specification relating to the annexed drawings wherein:

FIG. 1 is a sechematic illustration of a portable permeable film pack for the protection of personnel, when present in atmospheres contaminated with radioactive airborne particles, germs and/or chemical warfare agents;

FIG. 2 is a cutaway view of a survival shelter for use during periods of atmospheric contamination by radioactive airborne particles, germs and/or chemical warfare agents:

Figure 3:
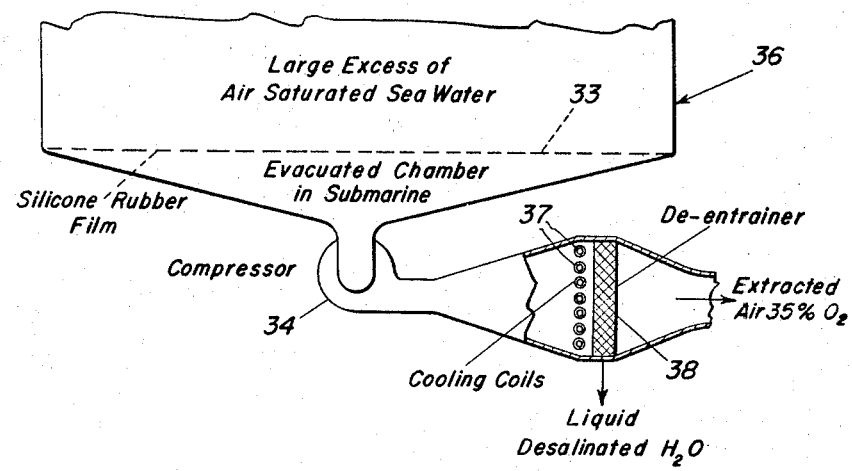
FIG. 3 is a schematic diagram of a system for extracting oxygen-rich air from sea water.

FIG. 5 schematically illustrates apparatus for supplying breathing air for a miniature submarine by extracting dissolved oxygen from the water surrounding the submarine while submerged;

FIG. 6 is a more detailed three-dimensional view of the manner of mounting the permeable film for use in such arrangements as are illustrated in FIGS. 1, 3 and 5;

FIG. 7 schematically represents a membrane cell construction for removing $CO_2$, $H_2O$ and human odor from a vehicle, such as a space capsule, wherein the pressure outside the vehicle is lower than the pressure in the vehicle; and FIGS. 8 to 12 show one method of producing unbacked thin films for use in this invention.

As shown in FIGS. 1–7, permselective membranes of increased effectiveness find particular application in the securing for humans (and, if desired, for animals) of safe oxygenating environments under adverse conditions. Of the apparatuses shown, permeation is effected by the application (or presence) of a difference in total pressure on the opposite sides of the permeable membrane in the structures in FIGS. 3 and 7, while in the structures in FIGS. 1, 2 and 5 the driving force to effect permeation is the difference in partial pressures of the gases to be exchanged ($CO_2$ to be removed from the breathing air and $O_2$ to be added thereto).

Thus, in FIG. 1 is shown a portable air regenerator apparatus 10 using permselective membranes to provide breathing air for an individual present in surroundings rendered hostile by chemical toxicity, germs and/or radioactivity. Preferably the apparatus 10 comprises an airtight mask 11 to which is connected a box 12 containing several square yards of thin silicone rubber film 13 having a uniform thickness preferably in the range of from 0.1 to 1.0 mil. The range may be extended to employ films of 2.0 mils thickness, but the vast area of film that would be required by using films of greater thickness than 2.0 mils would render the device impractical. This film 13 is so arranged in box 12 that the wearer's breathing air is contained by film 13 on one surface thereof, while contaminated atmospheric air is presented to the opposite surface of film 13. The expired breathing air, which is depleted in $O_2$ and enriched in $CO_2$ and water vapor, is circulated past the permeable film via hose 14 and manifold header 16 by the normal action of the individual's respiratory muscles resulting in contraction and expansion of the lungs. As this expired air flows by the separate layers of film 13 from the header 16, the partial pressure driving force for $CO_2$, water vapor and $O_2$ between the outside air and the expired air causes $CO_2$ and water vapor to permeate to the outside, while $O_2$ permeates inwardly to regenerate the expired air, which is collected at manifold header 17 and returned to mask 11 via hose 18. The path travelled by the spent air may be lengthened by the use of baffles 19 extending between each set of films. Also positive circulation is insured by the use of a one-way valve (not shown) in hose 14.

Since permeation is actually a solution process in which the gases dissolve in the film and then diffuse through the film in the dissolved state, the film 13 forms a pore-free barrier to any solid, liquid or gas, which does not chemically dissolve in the silicone rubber.

The driving force required to circulate the expired air past the permeable film 13 is less than a tenth of an inch of water pressure, that mainly being the driving force required to actuate the light-weight check-valve (not shown). This driving force is less than that required to pull gas through a dust filter, and this gives little discomfort to the wearer. Outside air is brought in contact with the permeable film 13 by ordinary gaseous diffusion, and by convection of the warmed outside air up through the channels 20 in pack 12, this air being warmed by the heat carried in a man's breath. As shown more clearly in FIG. 6 outside fluid channels (such as channels 20) will alternate with channels receiving the expired air.

As an example, approximately 10.5 square yards of one-mil silicone film may be carried in pack 12. This would be sufficient to maintain a wearer's inhaled air at an oxygen content of 16 percent and a carbon dioxide content of one percent, assuming he was walking at 2 m.p.h. (i.e. 400 cc. $O_2$/min. consumed). At this oxygen concentration he would be working at an oxygen partial pressure equivalent to that found at 7000 ft. above sea level.

Since the wearer does not have to carry an $O_2$ source or $CO_2$ absorber, or an adsorber for contaminants, he can use this oxygen regenerating and purifying system indefinitely without recharging or shutting down in any way. No recurring charge for chemicals will be necessary, and the initial cost of the film pack should be of the same order of magnitude as for present micro-porous filters. The pack is very light in weight, because of the reliable thinner silicone film now developed.

Such an air purifying system would be useful in the following environments:

(1) In manufacturing areas containing plutonium, thorium, or beryllium dust;
(2) In bacterial or germ-laden areas;

(3) In dust-filled or pollen-filled areas;
(4) In smoke-filled areas, as long as $O_2$ was not depleted, or
(5) In areas contaminated with certain nerve gases.

A similar use of silicone permselective membranes can be made in fall-out shelters as shown in FIG. 2. The outside contaminated air by permeating the silicone rubber membranes will lose the contaminants in the air and purified air containing a sufficient concentration of oxygen will be produced in fall-out shelter 21.

Although much has been printed concerning the requirements of fall-out shelters for securing protection against external radiation, little has been said about the means of providing clean, safe air for the inhabitants of such a shelter. It is generally supposed that a filter can be used to provide fresh air, but the design of such a filter is most complex. It must provide protection against radioactive airborne particles, against germs, and against chemical warfare agents for as long as several weeks and the energy requirements for pulling air through the filter must be low.

Another method proposed is to seal off the shelter from outside air, and use certain chemicals in the shelter to absorb $CO_2$ and others to release $O_2$. Not only are such chemicals expensive, but they have a maximum capacity, which depends on the amount thereof stored in the shelter.

As opposed to these latter methods of providing fresh clean air, with this invention air within the shelter is continuously passed over one side of each of a plurality of polymer films 22, each of which has outside contaminated air in contact with its opposite surface. Oxygen permeates from the outside air through the film 22 in gas exchanger 23 into the shelter 21, and simultaneously $CO_2$ and water vapor permeate from the spent air in the shelter 21 outwardly through the film and into the outside air. In the case of silicone rubber membranes the permeation rate for water vapor is even greater than for $CO_2$ and as a result the limiting factor for the extent of silicone rubber film area required is met by designing for $CO_2$—$O_2$ exchange. Given a sufficient area of highly permeable film 22, an $O_2$ content of 16 to 18 percent and a $CO_2$ content below one and one-half percent can be easily maintained in the shelter. Since the film 22 is permeable (and not porous) dust, germ cells, etc. cannot pass through the film. Under these conditions, living could go on indefinitely, with no danger of contaminated air getting into the shelter.

One possible design for this permeator or gas exchanger 23 is shown in FIG. 2. Outside air is circulated by natural convection through open-ended alternate channels 24 in the permeator 23, while the inside air is circulated through the other alternate channels 26 by one of several methods. These alternates include (1) natural convection due to the shelter air being warm, (2) as small hand air blower, or (3) face mask which would use the power of the respiratory muscle to circulate the air. In the arrangement shown air exhaled in the living space 27 passes by convection up through conduit 28 into manifold 29 and through channels 26, where the reduction in $CO_2$ content and increase in $O_2$ content takes place. The air so refreshed passes from manifold 31 to living quarters 27 via return duct 32 by natural convection.

Figure 4:
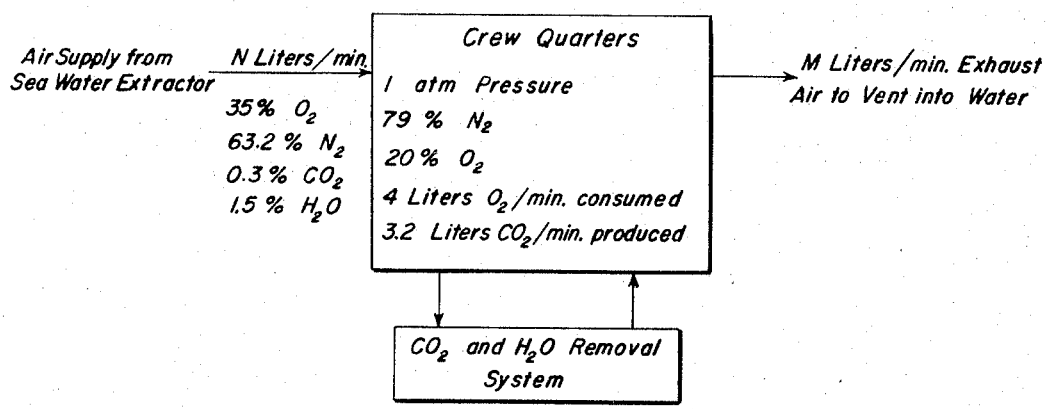
FIG. 4 is a flow diagram illustrating the passage of gases to and from the crew quarters of a submarine using the system shown in FIG. 3.

Another of the more important uses to which permselective membranes can be put is to extract oxygen from water to support life. This particular means for obtaining air is especially adaptable for supply of breathing air to submarines (as shown in FIGS. 3–5), which remain under water for indefinite periods of time. The capability of certain films with particular permeation capabilities to extract air from water depends upon the fact that the water of most oceans to a depth of about 100 meters, is saturated with atmospheric oxygen to from 90 to 105 percent the saturation value at standard conditions of temperature and pressure. To a certain extent, this process simulates the gills of a fish, except that in this case there is an extra gas phase present between the sea water and the blood stream.

In order to better understand how this gas extraction from water occurs, it is necessary to be cognizant of certain principles controlling the behavior of permeable films. Contrary to general belief the rate of permeation of a gas through a film is proportional to the activity gradient across the film, and is not proportional to the absolute pressure gradient. Activity may be related to pressure by an activity coefficient, which may be expressed as the ratio of the fugacity to the pressure and this ratio is equal to unity for an ideal gas. This term is more completely defined in the Textbook of Physical Chemistry—Glasstone (2nd edition—Van Nostrand Company, Inc.—1946) on page 301.

In the case wherein a liquid phase is present on one side of the film, the pressure and activity gradients can be greatly different, and it is really the activity gradient which controls the amount and direction of gas permeating a membrane. Thus, for a given membrane properly supported against the increased pressure applied thereto by the water, if it be assumed that one side of a film is kept at zero pressure and liquid water at varying pressures is present on the other side of the same film as would occur at different depths, the rate at which the water will permeate through the film will remain substantially the same regardless of whether the water pressure is at 0.1, 1, or 10 atmospheres for in each case the activity gradient is approximately equal to the room temperature vapor pressure of water. Further the permeation rate will remain substantially the same, even if water vapor at but a few centimeters of pressure is substituted for the liquid water on the high pressure side of the film. Therefore, for a given pressure on the low pressure side of a permeable membrane, the only way the actual permeation rate of water can be increased is to increase the temperature (and hence the saturation vapor pressure and activity) of the water on the high pressure side of the film. Similarly, if water is saturated with air at one atmosphere pressure, the total activity of the gaseous components in the water will remain essentially one atmosphere regardless of what the absolute pressure of the water may become.

Since sea water is saturated with air to a considerable depth, if, for example, a silicon rubber film 33 (FIG. 3) is supported so that one side thereof is exposed to a moving stream of water, while the other side thereof is continuously evacuated by compressor or pump 34, oxygen and nitrogen will be extracted from the water, permeating the membrane to the evacuated side. The mechanical support for the film 33 is, of course, required to enable film 33 to withstand rupture or collapse under the pressure of the water, which pressure increases with depth. By compressing and then cooling the gas and vapor that has permeated film 33 a suitable air supply is provided and also some liquid water. This water is even desalinated, so that this method of air extraction not only extracts breathing air from sea water but also produces potable water as well. When the film 33 is of silicone rubber, the extracted air, which will be obtained will be enriched in oxygen, because of the higher permeability of oxygen through the silicone rubber film and also, because of the higher solubility of oxygen in sea water.

As a specific example, one can consider the case of a submarine with a ten-man crew and assume that on the average each man in the submarine consumes 400 cc.'s of oxygen per minute and generates 320 cc.'s of carbon dioxide per minute. The carbon dioxide concentration can be reduced in the crew quarters by any one of a number of methods, as for example, chemical adsorption, or by concentration and rejection. This is shown schematically in FIG. 4 as a flow diagram. The latter method may be effected by the use of films selectively permeable to carbon dioxide.

To maintain an atmosphere containing about 20 mole percent oxygen in the crew quarters of the submarine, about 21.1 liters per minute of air containing about 35 mole percent oxygen would have to be extracted from the sea water to sustain the ten-man crew. Based on the known permeability of silicone rubber films, this capacity would be provided by a permeator, or extractor unit 36 with an operating surface of 26 square yards of 0.5 to 1 mil silicone rubber film and with a flow of water through such a cell of about 75–100 cubic feet per minute. With the low pressure side of film 33 being operated at 1 cm. mercury, only about 300 watts of compressive work would have to be expended for a ten-man crew and this work demand can be further reduced by increasing the operating film area in the extractor unit 36. In addition to supplying the oxygen required for ten men, extractor 36 would also provide about 75 to 90 pounds of desalinated water per day as a useful byproduct.

As the large excess of air-saturated sea water passes the face of silicone rubber membrane 33, the vacuum on the other side of the silicone rubber membrane induced by compressor 34 reduces the pressure so as to promote the permeation of water and oxygen and nitrogen through the membrane 33. As this gas is withdrawn from adjacent the membrane 33 it is compressed by compressor 34. Next, the water vapor in the gas is removed by cooling coils 37 and de-entrainer 38. The resulting air stream is oxygen-enriched, containing about 35 percent oxygen. The method for maintaining the oxygen and nitrogen balance with 35 percent oxygen feed to the crew quarters is shown in FIG. 4.

Where minimum power is available, for instance in a miniature submarine, it is possible for the operator to regenerate his own breathing air without requiring a compressor to remove and compress the gas permeating through the permselective film. Such an arrangement is shown in FIG. 5.

FIG. 6 shows in some detail the manner in which a film pack 40 useable in the apparatuses of FIGS. 1, 3 and 5 would be constructed. The film pack 40 is disposed so that the oxygen-bearing fluid at higher pressure enters the open ends of alternate channels 41 via inlet holes 42, flows over the surfaces of silicone rubber permselective membrane 43 of optimum construction and exits from the unit 40 via holes 44. In the case of the application illustrated in FIG. 1 and as well in FIG. 2 the oxygen-bearing fluid is air, which yields oxygen to the breathing air and picks up $CO_2$ and water vapor therefrom. The oxygen-bearing fluid is water in the case of the arrangement proposed in FIG. 3 and this water serves as the source of oxygen, nitrogen and water. In FIG. 5 the arrangement once again employs water as the oxygen-bearing fluid and serves to yield oxygen and to pick up $CO_2$ through the silicone film. The output header 46 extends through the plurality of frame supports 47, which define the oxygen-bearing fluid channels 41, and communicates with the breathing air chambers 48, which alternate with channels 41. In a similar fashion distribution header 49 extends through the frame supports 47 and communicates with the chambers 48 to supply the expelled air thereto to enable the requisite gas exchange to occur. In the usual construction porous packing 51 (e.g. leached urethane foam, glass fiber batting, corrugated cardboard, porous metal) is employed in chambers 48 to lend support to films 43 to prevent their collapse toward each other. Wherever the permselective films would be subjected to a significant pressure differential as, for example, with increasing depth in underwater applications (FIGS. 3 and 5), mechanical support for the film must be able to support the film and still permit passage of gases therethrough. Obviously upon movement to significant depths man is unable to expand his lungs against the outside water pressure as required to cause oxygen-bearing gases to enter his lungs and under these circumstances man must isolate himself, or at least his breathing apparatus from direct contact with the water as, for example, within the hull of a submarine.

It is known that man can live and work in an atmosphere having 16 mole percent oxygen and 1.5 mole percent carbon dioxide. A man inhaling this air, would exhale air containing about 12 mole percent oxygen and 5 mole percent carbon dioxide. By exhaling this air and conducting it past a film exposed to air-saturated water, the activity gradient of the oxygen between the oxygen-bearing fluid and the gas phase would cause oxygen to permeate through the film into the depleted exhaled air. At the same time, carbon dioxide would permeate through the film in the opposite direction, and in this manner the air would be regenerated to the tolerable conditions of 16 percent oxygen and 1.5 percent carbon dioxide. However, one condition that is necessary for this gas exchange to occur in the submarine 52 (FIG. 5) is that sufficient water must move through film pack 40 (as shown by the arrows) to supply the required oxygen. It is estimated that a water rate of about 14 cubic feet per minute passing through the film pack 40 over the membranes 43 is sufficient. Such a water rate can be obtained either by moving submarine 52 through the water at the proper minimum rate of speed or by pumping this much water through film pack 40 when the submarine is at rest. In the arrangement shown hose 53 connected between face mask 54 and distribution header 49 is provided with a one-way valve (not shown) and conducts spent breath to film pack 40 for gas exchange with sea water passing therethrough. The regenerated air is returned to face mask 54 via evacuation header 46 and hose 56.

Another serious problem involving the provision of a liveable environment for man (or other animal life) occurs in a space vehicle. In solving the problem of providing breathing air for capsule inhabitants the weight of the system employed is of utmost concern. For short flights a supply of oxygen can be carried along in the form of liquid oxygen or as pressurized oxygen gas, however, this solution still requires provision for the removal of $CO_2$, water vapor and noxious body odors from the vehicle. The means employed so far for effecting such removal has been to employ various filters, absorbers and cooling devices. Although the removal of $CO_2$, water vapor and noxious body odors can be effectively accomplished thereby, these solutions to the problem impose a weight penalty burden that can be substantially reduced by utilizing a permeation system as disclosed herein.

The device shown in FIG. 7 is an illustration of the manner in which such a permeation system may be constructed and employed. The cell 60 is constructed with the system of alternately arranged channels much as is shown in the film pack 40. However, in this instance the object is to pass $CO_2$, water vapor and noxious odors out of the vehicle into space. As shown, cell 60 forms part of the external wall 61 of the space vehicle. The air in the space vehicle is conducted into manifold 62 from which it passes into alternate channels 63 to be passed over the surfaces of membranes 64. The pressure differential between channels 63 and space provides the driving force for the permeation of $CO_2$, water vapor and the noxious gases through the membranes 64 to space via holes 66. In order to protect membranes 64 against rupture due to this pressure differential, porous support means 65 is provided in the chambers shown vented to space through holes 66. The breathing air of reduced impurity content then passes to manifold 67 for recirculation into the interior of the space vehicle. A certain amount of oxygen is also lost to space through the permeable membranes and the replenishing of the gas content of the space vehicle is accomplished by adding oxygen, as from tank 68, to the air leaving manifold 67, as shown. In Table I, data on silicone rubber as a membrane material are provided. The rates for $NH_3$, $H_2S$ and the hydrocarbons are indicative of the effectiveness with which body odors will permeate the membrane.

TABLE I.—ROOM TEMPERATURE PERMEATION RATES IN SILICONE RUBBER

| Gas | $Pr \dfrac{\text{cc. gas NTP, cm. thick}}{\text{sec., sq. cm., cm. Hg}}$ |
| --- | --- |
| $N_2$ | $28 \times 10^{-9}$ |
| $O_2$ | $60 \times 10^{-9}$ |
| $CO_2$ | $320 \times 10^{-9}$ |
| $H_2O$ | $3800 \times 10^{-9}$ |
| $NH_3$ | $590 \times 10^{-9}$ |
| $H_2S$ | $650 \times 10^{-9}$ |
| $CH_4$ | $95 \times 10^{-9}$ |
| $C_3H_8$ | $410 \times 10^{-9}$ |
| $C_5H_{12}$ | $2000 \times 10^{-9}$ |
| $C_6H_6$ | $1910 \times 10^{-9}$ |
| Pyridine | $2100 \times 10^{-9}$ |

By the use of this construction it is proposed to reduce the weight of the apparatus that must be delegated to the task of removing noxious gases from the space vehicle. Studies indicate that the size of the regenerating permeable membrane cell 60 need not exceed one cubic foot and could be as small as 0.1 cubic foot.

A preferred method for the preparation of silicone rubber membranes particularly applicable to use in the novel structures of this invention is described in connection with FIGS. 8 to 12. Therein is disclosed the filled silicone rubber film 71 containing a cure accelerator with a backing 72 therefor unwinding from roll 73 with the backing (such as cellulose acetate) being wound back on roll 73'. The silicone rubber film will have been obtained by previous calendering or other such suitable means and by giving the silicone film a partial cure by heating as indicated previously. Any pinholes present in the calendered film may be patched as described previously with the same material from which the film itself is made. These patches 74 are readily adherent to the base film in the uncured or incompletely cured state so that a bond of sufficient strength is achieved merely by bringing the patch into intimate contact with the film.

FIG. 9 shows a cutaway view of the two films 71 and 71' superposed on each other prior to establishing contacting relationship; the lack of coincidence of the holes in the films is shown in this view.

Thereafter, as shown in FIG. 10, the dual films 71 and 71' are stretched from about 25 to 500 percent (in one or both directions) and in this stretched condition are clamped together by means of a frame 75 held in place by screws 76. This frame and film are held by clamps 77 (only one being shown) over the evacuating apparatus 78 as shown in FIG. 11 whereby the two films 71, 71', supported on porous screen 79, are forced into intimate contact over their entire contact area by the removal of air from between the films by the application of a vacuum by the evacuating apparatus beneath the films. This application of a pressure gradient to the films effects the elimination of air from between the films by permeation. The consolidated film 80 in the stretched, clamped state is then cured as shown in FIG. 12 by any of the means recited previously, for instance by heating at temperatures from about 150 to 250° C. for times ranging from about 2 minutes to 2 hours or more to yield a cured, stretched, consolidated thin film, which then can be used as a permselective membrane of increased effectiveness, because of its combined qualities of extra thinness and freedom from perforations.

Preferably at least the final stretching of films 71, 71' is not effected until the films have been brought into such intimate contact as to eliminate air from between the films either by permeation through one film (by the application of a high pressure gradient as in FIG. 11) or by permeation through both films (by the inwardly direction of pressure on both outer faces of films 71, 71' by means of porous metal plates or structural means with very fine perforations therethrough).

Whereas, if the stretched composite film 80 were released without first curing the silicone rubber, the material would revert to its earlier area, it has been found that the stretched film, when cured, does not shrink or at most shrinks only a small amount upon removal of the restraining force as the stress of stretching is relaxed by the curing step.

In order that those skilled in the art may better understand how this invention may be practiced, the following examples are given by way of illustration and not by way of limitation. All parts are by weight.

*Example 1*

An organopolysiloxane material capable of later conversion to the cured, solid, elastic state was prepared by heating at a temperature between 110–155° C. with agitation over a period of about 4 hours, 100 parts of octamethylcyclotetrasiloxane in the presence of 0.001 part of potassium hydroxide. The resulting polydimethylsiloxane was a highly viscous, benzene-soluble mass of only slight flow, and had a ratio of approximately 2 methyl groups per silicon atom and a viscosity of about 6 million centistokes. A mixture of about 100 parts of the above-described polydimethylsiloxane and 43 parts of fume silica was milled on a rubber mill and to the resulting filler-polymer mixture was added 1.5 parts of benzoyl peroxide. This mixture of ingredients will hereinafter be referred to as "convertible methylpolysiloxane."

*Example 2*

The above convertible methylpolysiloxane was calendered on a two-roll calendering mill with a backing of cellulose acetate until a silicone rubber film about 2.5–3 mils was obtained. Since this silicone rubber film was found to have several pinholes upon visual observations, the pinholes were covered with small pieces of the same calendering film (free of the backing), so that a close bond was effected between the patch and the base film. This calendered silicone rubber film, which had been given a heat treatment (to effect a light cure) for 30 seconds at 155° C. during the calendering operation, was then separated from the cellulose acetate support film, and two equal areas (9" x 9") of this silicone rubber film were superposed on each other and stretched in contacting relationship over a frame (see the accompanying FIGS. 11 and 12), so that the area of the film was increased to a size approximately 500 percent greater than the original composite film (9" x 9"). The two films were pressed against each other using air pressure to create a pressure differential to force the two component films into intimate contact. While in the stretched condition in contact with each other, the composite film was then subjected to additional heating for one hour at 175° C. to effect complete cure of the films and bonding of the individual internal surfaces of the component films to each other. Thereafter, this unified bonded composite film about 1 mil thick was placed over a form for use as a permselective membrane. When films of this thickness were used as gas separating membranes, it was found that the gases removed from the opposite sides of the membrane were greatly enriched in oxygen on the one hand and carbon dioxide on the other hand as reported in the aforesaid Kammermeyer patent, but at a rate of gas permeation through the membrane considerably in excess of the rates achieved in the past. Also, it was found when such thin films were used for the purposes described in my copending patent application Ser. No. 247,904 (filed Dec. 28, 1962 and assigned to the assignee of this invention) gases such as xenon and krypton could more readily be removed from mixtures of the latter gases with oxygen and nitrogen.

Therefore, a number of novel structures have been presented, whose practicability are considerably enhanced by the development of the highly improved silicone rubber permeable membrane of substantially reduced uniform thickness made by the process described herein and having the unique high permeation rates for $CO_2$ and water vapor indicated in Table I. Variations of the process and structural arrangements proposed herein are contemplated without departing from the scope and intent of the appended claims.

What I claim as new and desire to secure by Letters Patent of the United States is:

1. In a vehicle for operation in the low pressure rarified expanse of space, the vehicle comprising an enclosure for supporting animal life processes during operation of the vehicle, the improvement comprising:
   (a) the wall area of the enclosure being impermeable,
   (b) a chamber having permeable non-porous wall area,
      (1) said permeable non-porous area being of silicone rubber film located outside the impermeable wall area of said enclosure and disposed for contact with the ambient,
   (c) first means for conducting high humidity air having a greater carbon dioxide concentration and a smaller oxygen concentration therein than is characteristic of normal air from within said enclosure to said chamber,
   (d) second means for returning air having smaller oxygen concentration and substantially smaller concentration of carbon dioxide and water vapor than is characteristic of normal air from said chamber to the interior of said enclosure, and
   (e) means disposed within said enclosure and in flow communication with said second means for adding oxygen to the returning air.

2. In a vehicle enclosure for containing and supporting animal life processes during transport at significant depths in water containing dissolved air, the improvement comprising:
   (a) the wall area of said vehicle enclosure being impermeable and able to withstand the application of high pressure thereto,
   (b) a chamber having permeable non-porous wall area,
      (1) said permeable non-porous wall area being of silicone rubber film located outside the impermeable wall area of said vehicle enclosure and disposed for contact with the surrounding water,
   (c) first means for conducting air having a greater carbon dioxide concentration and a smaller oxygen concentration therein than is characteristic of normal air from within said vehicle enclosure to said chamber,
   (d) second means for returning air containing at least about 16 mole percent oxygen and a maximum of 1.5 mole percent carbon dioxide from said chamber to the interior of said vehicle enclosure, and
   (e) porous means in contact with one side of said silicone rubber film for supporting said silicone rubber film against movement under the application of significant pressure by the surrounding water.

3. In a respirator device for individual use comprising a face mask to be worn by the user, a chamber in communication with said face mask and means for removing harmful substance from the air entering said chamber, the improvement comprising:
   (a) wall area of the chamber being constructed of permeable, non-porous material in contact with the atmospheric air, and
   (b) means for conducting gases in a circuit to said chamber and back to said mask by separate route.

4. The individual air regenerator substantially as recited in claim 3 wherein the permeable wall area is of silicone rubber.

5. The process for extracting an oxygen-containing gas phase from water, which contains air dissolved therein, which comprises:
   bringing water containing dissolved air into direct contact with one side of a silicone rubber permselective membrane,
   simultaneously removing from the opposite side of said membrane oxygen and nitrogen gases and water vapor permeating through said film members and
   introducing a difference in the partial pressure of oxygen and nitrogen gases and water vapor on said one side as compared to the partial pressure of oxygen and nitrogen gases and water vapor on said opposite side
thereby causing the passage of oxygen, nitrogen and water vapor through said membrane to replace oxygen, nitrogen and water vapor so removed.

6. The process as in claim 8 in which the permselective membrane is a polydimethylsiloxane rubber.

7. The process for extracting oxygen from water at significant depths, said water containing dissolved air, which process comprises:
   passing water across and in direct contact with one surface of a permselective membrane,
   mechanically supporting said permselective membrane from movement under the application of water pressure applied to said one side thereof,
   passing an oxygen depleted and carbon dioxide enriched air stream over and in direct contact with the opposite side of said membrane
so that oxygen from the water permeates through said membrane and increases the oxygen content of the air stream, while simultaneously carbon dioxide from the air stream permeates through said membrane into the water.

8. The process as in claim 7 in which the water passed in direct contact with the permselective membrane is provided at a flow rate of at least about 14 cubic feet per minute.

References Cited

UNITED STATES PATENTS

| | | | |
|---|---|---|---|
| 307,041 | 10/1884 | Herzog | 55—158 |
| 693,638 | 2/1902 | Breuer | 55—158 X |
| 2,223,586 | 12/1940 | Thomas | 55—158 |
| 2,433,741 | 12/1947 | Crawford | 55—16 |
| 2,506,656 | 5/1950 | Wallach et al. | 55—16 |
| 2,966,235 | 12/1960 | Kammermeyer | 55—16 |
| 2,970,106 | 1/1961 | Binning et al. | 55—16 X |
| 3,196,871 | 7/1965 | Hormats et al. | 55—158 X |
| 3,228,394 | 1/1966 | Ayres | 128—142 |
| 3,333,583 | 8/1967 | Bodell | 210—321 X |

SAMIH N. ZAHARNA, *Primary Examiner.*

REUBEN FRIEDMAN, *Examiner.*

J. ADEE, *Assistant Examiner.*